(12) United States Patent
Patil et al.

(10) Patent No.: US 6,348,224 B1
(45) Date of Patent: Feb. 19, 2002

(54) BLACK TEA MANUFACTURE

(75) Inventors: Rajesh Hanamantagouda Patil, Mumbai; Krishnamurthy Raju; Prakesh Dattatraya Virkar, both of Bangalore, all of (IN)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/527,310

(22) Filed: Mar. 16, 2000

(51) Int. Cl.7 .............................. A23F 3/00; A23F 3/06; A23F 3/14
(52) U.S. Cl. ........................ 426/49; 426/597; 426/442
(58) Field of Search .......................... 426/49, 597, 442

(56) References Cited

U.S. PATENT DOCUMENTS 3,971,858 A * 7/1976 Collier et al.
4,135,001 A    1/1979 Edmonds et al.

FOREIGN PATENT DOCUMENTS

| GB | 892278 | 3/1962 |
| GB | 1 485 362 | 9/1977 |
| WO | WO 97/40699 | 11/1997 |

* cited by examiner

Primary Examiner—Anthony J. Weier
(74) Attorney, Agent, or Firm—James J. Farrell

(57) ABSTRACT

A method for manufacturing black leaf tea. The method involves macerating freshly plucked tea leaves, treating the leaves with ammonium bicarbonate, fermenting the treated leaves, firing the leaves to arrest fermentation and then drying them to yield black leaf tea.

6 Claims, No Drawings

BLACK TEA MANUFACTURE

BACKGROUND—FIELD OF THE INVENTION

The invention relates to a method of manufacturing black tea. More particularly, a modification of the standard method of black tea manufacture that provides a significant improvement in liquor quality.

BACKGROUND—DESCRIPTION OF PRIOR ART

In the manufacture of black tea, young leaves usually 2–3 leaves and a bud are plucked and withered for about 12–24 hours to reduce moisture and to bring about desirable chemical/Biochemical changes. Withering process allows certain chemical and biochemical changes to occur and also the moisture content of the leaves is brought down from 90% to 50–70%. The tea leaves are then macerated using a Cut-tear-and curl machine (CTC machine) or rolled using rollers. This disrupts the cellular integrity of leaf tissues and allows oxidation of catechins by enzyme polyphenol oxidase which results in the development of colour pigments i.e. theaflavin and thearubigins. The macerated leaves are fermented for a suitable time and then fired at a high temperature to stop the enzyme activity.

The taste of black tea is a result of the complex interaction, between the polyphenols, caffeine, theaflavins and thearubigins that occurs during the fermentation. This interaction also contributes to the brightness, briskness, colour, thickness and body of black tea.

The price of tea depends on its quality and the quality of tea depends largely on the treatment steps. The quality of tea is evaluated based on parameters such as colour; brightness; tea flavour; body; bitter taste etc.

The applicants have found that the bitter taste of black tea can be significantly reduced by treating the plucked tea leaves with ammonium bicarbonate. This treatment also improves the brightness of tea, which is also a quality criterion.

United Kingdom patent specification GB 1,485,362 (Unilever) discloses treating black, green or oolong tea with an aqueous solution of ammonium bicarbonate or ammonia to improve the extraction of soluble solids. The compounds are suitable for use as a process aid as they leave negligible non-tea residue.

OBJECTS OF THE INVENTION

It is an object of the present invention to provide a modification of the standard method of black tea manufacture that provides a significant improvement in liquor quality.

The improvement in liquor is evidence in terms of brightness, yellowness, thickness and with astringency.

It is also an object of the present in invention to provide a modified method of black tea manufacture that provides black leaf tea from which infusions give a bright yellowish brown end cup that is superior to that prepared from standard processed black leaf tea.

SUMMARY OF THE INVENTION

The present invention relates to an improved process for the treatment of tea leaves consisting of the known steps for preparing black tea the improvement wherein comprises treating the tea leaves prior to the step of fermentation with ammonium bicarbonate having a concentration of 0.001 to 2% by weight of black tea for 10 minutes to 24 hours at a temperature between 10 and 45° C.

The treatment with ammonium bicarbonate may be repeated at one or more stages prior to fermentation. Usually the known treatment for producing black tea commercially comprises the steps of withering followed by fermentation. The ammonium bicarbonate used for the treatment is food grade.

"Tea" for the purposes of the present invention means leaf material from *Camellia sinensis var.* sinensis or *Camellia sinensis var.* assamica. It also includes rooibos tea obtained from Aspalathus linearis however that is a poor source of endogenous fermenting enzymes. "Tea" is also intended to include the product of blending two or more of any of these teas.

"Leaf tea" for the purposes of this invention means a tea product that contains one or more tea origins in an uninfused form.

Except in the operating and comparative examples, or where otherwise explicitly indicated, all numbers in this description indicating amounts or concentrations of material ought to be understood as modified by the word "about".

DETAILED DESCRIPTION OF THE INVENTION

Tea manufacture, especially black tea manufacture, traditionally comprises: withering, rolling, fermenting and firing. The present invention comprises a modification of that method which involves treating the plucked tea leaves with ammonium bicarbonate preferably prior to fermentation.

Withering is a process whereby the plucked tea leaves are stored for periods of time (perhaps up to 24 hours), during which they undergo various biochemical and physical changes which often includes a loss of moisture. It is optional but preferred.

Maceration follows the withering step, and traditionally the withered leaves are optionally rolled to bruise and crush the leaves i.e. break down the plant tissue structure. This will have the effect of liberating fermentable substrates and fermenting enzymes from within the plant cells and tissue. Modern tea manufacture usually includes this step however the plant cells and tissue is broken down by passing tea, which has usually been withered, through a cutting machine.

Preferably, the ammonium bicarbonate is in the form a solution which is applied to the leaves prior to fermentation. The solution can be applied in one dose or in split doses.

The treatment may be given in the form of a spray or a dip and is preferably given in the form of a spray to uniformly coat the macerated green leaf. The concentration of the compound is in the range 0.001 to 2% and preferably in the range 0.001 to 1%. The duration of the treatment is for 10 minutes to 24 hours and preferably 1 to 8 hours. The temperature during the treatment is maintained at 10 to 45° C. and preferably at 15 to 30° C.

The next step is commonly called fermentation but that is a misnomer. "Fermentation" is commonly used in the context of brewing alcohol to describe the action of exogenous enzymes. However in the tea world it is used to refer to the oxidative process that tea undergoes when certain endogenous enzymes and substrates are brought together by mechanical disruption of the cells by tearing or cutting the leaves. During this process colourless catechins in the leaves are converted to a complex mixture of yellow and orange to dark-brown substances and producing a large number of aromatic volatile compounds.

The colourful oxidation products include theaflavins and thearubigins. Theaflavins comprise several well-defined catechin condensation products that are characterised by their benzotropolone ring. Thearubigins are a group of undefined molecules with a large variance in molecular weight. They have a large variety of colours ranging from yellow to dark red and brown.

The fermented product is fired and dried to give a black leaf tea. The firing involves heating and drying the tea to destroy the fermenting enzymes and thereby arrest fermentation. It results in a reduction of moisture content to below 5%, and also leads to further chemical oxidation and changes in tea aroma. This generally involves exposing the tea to a blast of hot, dry air in a dryer.

The invention will now be demonstrated by the following examples.

EXAMPLES

Example 1

Fresh green tea leaves obtained from the field were withered for 16 hours to get a wither of around 70%. About 700 g of withered leaves were macerated by subjecting them to 4 CTC cuts in a mini manufacturing plant. At this stage ammonium bicarbonate as a 2.5% solution was added and the treated leaves were allowed to ferment for 50 minutes at 28° C. The fermented leaves were dried in a fluid bed drier at a temperature of around 100° C.

Control samples were made by an identical process but without the addition of ammonium bicarbonate.

Example 2

Fresh green tea leaves obtained from the field were withered in a tea factory for 18 hours to get a wither of around 70%. The withered leaves were preconditioned using the shredder and rotorvane. The preconditioned leaves were subjected to two CTC cuts. At this stage ammonium bicarbonate as a 3.1% dilute solution in water was sprayed, followed by two additional CTC cuts. The treated leaves were allowed to ferment for 60 minutes at about 30° C. The fermented leaves were then dried at a temperature of around 130° C. and sorted.

Control teas were manufactured under identical conditions but without the addition of ammonium bicarbonate.

Example 3

Fresh green tea leaves obtained from the field were withered in a tea factory for 18 hours to get a wither of around 70%. The withered leaves were preconditioned using shredder and rotorvane. The preconditioned leaves were subjected to one CTC cut, and at this stage a 3.1% solution of ammonium bicarbonate was added. This was followed by one more CTC cut. The treated macerated leaves were allowed to ferment for 25 minutes at about 30° C. The partially fermented leaves were subjected to two more CTC cuts, followed by another 25 minutes of fermentation at 30° C. The fully fermented leaves were dried in a fluid bed drier at a temperature of around 130° C. and sorted.

Control teas were made in an identical fashion but without the addition of ammonium bicarbonate.

Tasters' Scores

The treated and control teas according to the Examples 1, 2 and 3 were assessed by a panel of expert tasters. The treated tea was rated significantly superior to Control in terms of the overall liquor quality in terms of brightness, yellowness, thickness and with good astringency. The treated teas were rated to be significantly superior to the control teas, and were said to be characterised by a bright yellowish brown end cup. The control teas were said to be characterised by a reddish brown end cup. Considering the above mentioned attributes the tasters give a score on a 10 point scale which is presented in Table 1 below.

TABLE 1

Taste scores for treated and untreated teas

| Examples | Control | Treated |
| --- | --- | --- |
| Example 1 | 3.5 | 6.0 |
| Example 2 | 6.0 | 7.0 |
| Example 3 | 4.0 | 5.5 |

Thus the tea treated by the present invention clearly shows improved liquor quality.

We claim:

1. A method for manufacturing black leaf tea comprising the steps of macerating freshly plucked tea leaves, treating the leaves with ammonium bicarbonate, fermenting the treated leaves, firing the leaves to arrest fermentation and then drying them to yield black leaf tea.

2. A method according to claim 1 wherein the ammonium bicarbonate is added to the macerated leaves as an aqueous salt solution.

3. A method according to claim 2 wherein the concentration of the aqueous solution of ammonium bicarbonate is between 0.001 and 2% by weight of tea.

4. A method according to claim 3 wherein the aqueous solution of ammonium bicarbonate is sprayed onto the leaves.

5. A method according to claim 1 wherein the leaves are treated with the ammonium bicarbonate prior to the fermentation step.

6. A method according to claim 1 wherein the temperature during the ammonium bicarbonate treatment is maintained at 10 to 45° C.

* * * * *